Figure 1:
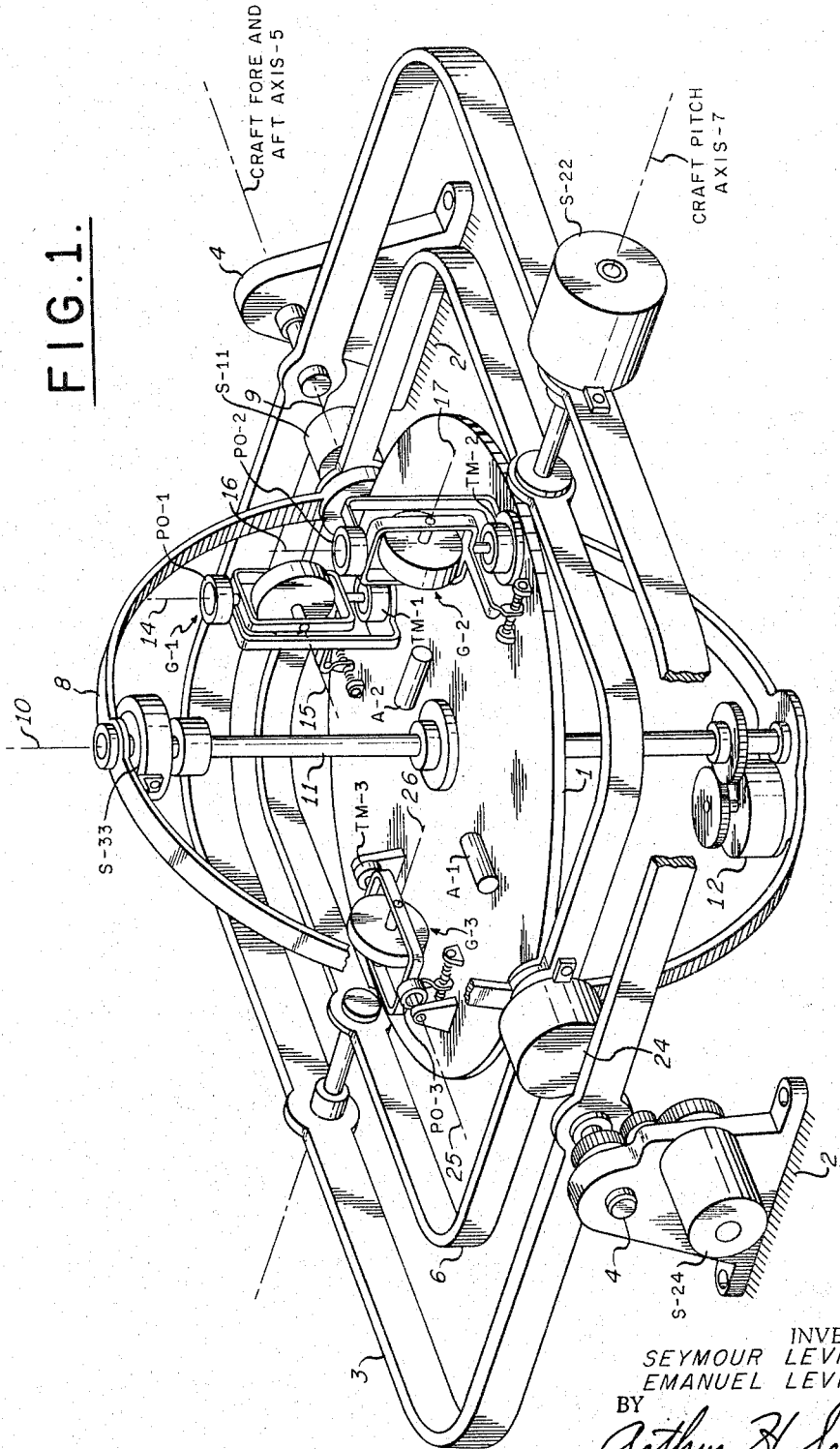

Dec. 5, 1967     S. LEVINE ET AL     3,355,954
STABILIZED PLATFORM

Filed June 25, 1965                     3 Sheets-Sheet 3

INVENTORS
SEYMOUR LEVINE
EMANUEL LEVINSON
BY
Arthur H. Serrell
ATTORNEY

United States Patent Office 3,355,954
Patented Dec. 5, 1967

3,355,954
STABILIZED PLATFORM
Seymour Levine, Centereach, and Emanuel Levinson, Jericho, N.Y., assignors to Sperry Rand Corporation, Great Neck, N.Y., a corporation of Delaware
Filed June 25, 1965, Ser. No. 466,914
12 Claims. (Cl. 74—5.34)

This invention relates to an improvement in the type of stabilized platform shown in application for U.S. Letters Patent Ser. No. 454,127, filed May 7, 1965, by Frank W. Edwards, Jr., and Max A. Schaffer for "Three Axis Gyroscopic Stable Platforms," where the platform is oriented quickly to true North without direction from the Earth's magnetic field. In the improved combination, the mechanical connection between the platform and the craft on which it is mounted preferably includes a gimbal structure providing three mutually orthogonal axes, one of which is normally vertical and two of which are normally horizontal. To stabilize the platform, a gyroscope of the single degree of freedom type is located on the platform for each of the noted axes. Motion of the platform about the vertical axis is controlled by the operation of motive means responsive to the output of the pick-off of one of the gyroscopes. Motion about the horizontal axis of the roll gimbal is similarly controlled by the output of the pick-off of the related gyroscope. Likewise, the pick-off of the third gyroscope is operatively connected to the motive means for controlling the motion of the platform about the normally horizontal pitch gimbal axis. In the improved combination, the horizontal axis stabilizing gyroscopes include torque motors that are responsive to output of respective mutually perpendicular acceleration sensors on the platform. To control the motion of the platform about its vertical axis the combination includes timing means and a computer or programming means responsive to the timing means for operating the torque motor of the vertical axis stabilizing gyroscope to move the platform cyclically about the axis through a range of at least one revolution in one direction and through a like range in the opposite direction. After orientation about the axis, the programming effected by the computer of the combination produces reversing sequences of angular motion of the member or platform about its axis with a cyclic range of at least 720 degrees to average the errors of the components of the stable platform. Such errors result from the effect of Coriolis on the platform, drift of the gyroscopes, misalignment of the axes of the gyroscopes and the platform, misalignment of the acceleration sensors, the torquing scale factor of the gyroscopes, the pick-offs, the torque motors and the sensors and for other reasons.

After initial orientation of the platform or member about its vertical axis to provide the inertial heading reference, the improved combination requires no directional input for navigation purposes. As the platform is moved sequentially at a fixed rate after the starting orientation, the combination requires a timing means to provide a measure of the passage of time from the initial point of orientation as well as a computer for programming the error averaging operation. Accordingly, an object of the present invention is to prevent the error in a platform of the character described from increasing with elapsed time.

A feature of the present invention resides in the inclusion in the combination of a timing means, and a computer responsive to the timing means for programming the reversing sequences of angular motion of the platform.

Figure 2:
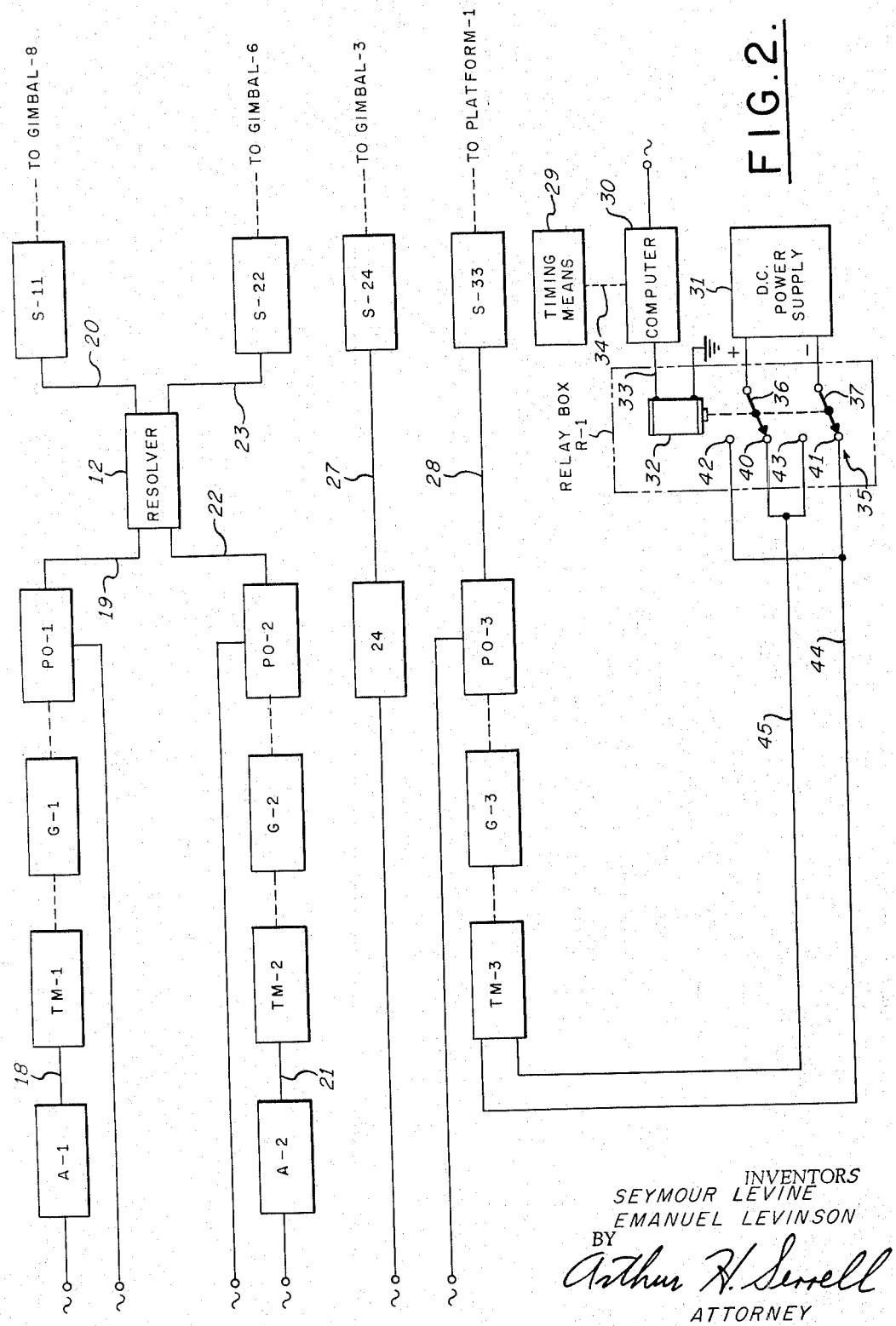
Figure 3:
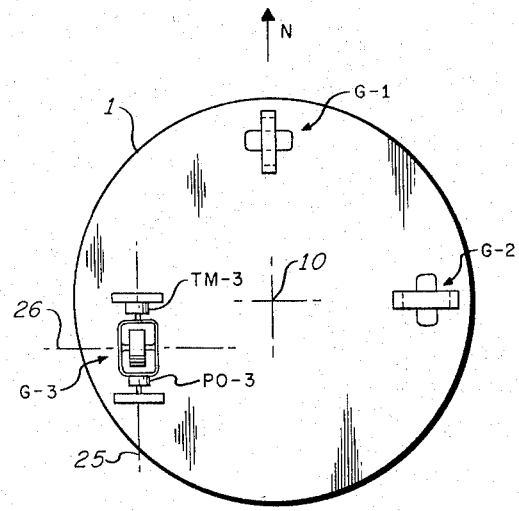
Figure 4:
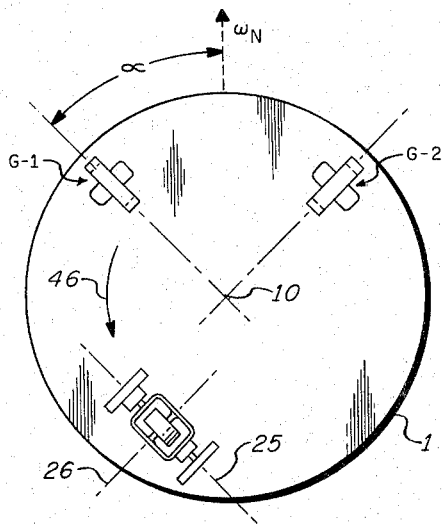
Figure 5:
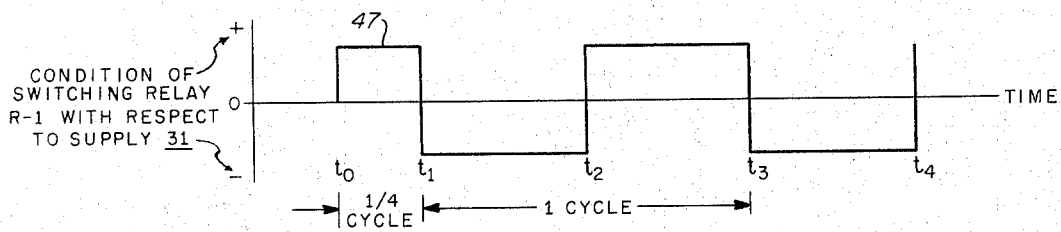
Figure 6:
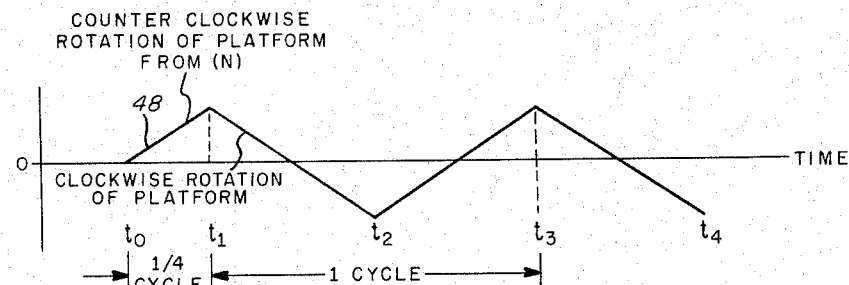

Other objects, features and structural details of the invention will become apparent from the following description of the improved platform in connection with the accompanying drawings in which:

FIG. 1 is a perspective view of the improved platform connection showing the stabilizing gyroscopes and the gimballing structure between the platform and the craft on which the platform is carried, FIG. 2 is a combined diagrammatic view and circuit diagram showing the connected elements of the improved platform combination, FIG. 3 is a diagrammatic view showing the angular relation between the gyroscopes and platform with the platform in oriented condition with respect to North about its vertical axis, FIG. 4 is a view similar to FIG. 3 showing the platform displaced through a counterclockwise angle α from its reference direction that is used in describing the operation of the improved platform combination, and FIGS. 5 and 6 are curves showing the timing of the reversals of the switching relay and the clockwise and counterclockwise rotations of the platform in each of the operating cycles of the combination.

In the improved combination shown in FIG. 1, the stable member or platform is indicated at 1. The chassis of the craft on which the platform 1 is carried is indicated at 2. The mounting structure for platform 1 includes a gimbal 3 supported on the chassis 2 by bearings 4—4 with freedom about an axis 5 corresponding to the fore and aft axis of the craft. Gimbal 6 is carried by gimbal 3 with freedom about a normally horizontal axis corresponding to the pitch axis 7 of the craft. A third gimbal 8 is carried by gimbal 6 with freedom about an axis 9 that is normally horizontal and aligned with axis 5. The fourth axis 10 of the stable platform is provided by shaft 11 which connects the platform 1 to the gimbal 8. Axis 10 of the platform 1 is normally vertical. Accordingly, the described gimbal structure mounts the platform on the craft with freedom about three mutually orthogonal axes, one of which is normally vertical as indicated by axis 10 and two of which are normally horizontal as respectively indicated by axes 9 and 7.

The stabilizing elements of the improved combination further includes a levelling motor S-22 mounted on gimbal 3 and connected to gimbal 6 to maintain the platform or member 1 level with respect to axis 7. Levelling about axis 9 is provided for the platform 1 by a motor S-11 mounted on gimbal 6 and connected to gimbal 8. The operation of the respective motors S-11 and S-22 is dependent on the angular relation between the rotor and stator components of a resolver 12 whose rotor is connected to shaft 11 and whose stator is fixedly mounted on gimbal 8. The elements of the combination that provide inputs to the resolver 12 include a first gyroscope G-1 shown in FIG. 1 as mounted on the platform 1 to precess about a vertical axis 14 and spin about a horizontal axis 15. The gimbal of gyroscope G-1 precesses about axis 14 and includes the rotor parts of a torque motor TM-1 and a pick-off PO-1. The stators of the elements TM-1 and PO-1 are fixed with relation to the platform 1. The element pick-off PO-1 provides an electrical output in accordance with the displacement of the gyroscope G-1 from a null or reference condition with respect to its precession axis 14. The other element of the related portion of the stabilizing combination for resolver 12 is provided by an acceleration sensor or liquid level A-1. As shown in FIG. 1, the sensor A-1 is fixedly mounted on the platform 1 so that normally the horizontal spin axis of the gyroscope G-1 is aligned with its longitudinal axis.

The other of the inputs to the resolver 12 is provided by a second gyroscope G-2 that is mounted on the platform 1 to precess about a vertical axis 16 and spin about a horizontal axis 17. The gimbal of gyroscope G–2 precesses about axis 16 and includes the rotor parts of a torque motor TM–2 and a pick-off PO–2. The stators of the elements TM–2 and PO–2 are fixed with relation to the platform 1. The pick-off element PO–2 provides an electrical output in accordance with the displacement of the gyroscope G–2 from a null or reference condition with respect to the precession axis 14 that is perpendicular to the null of PO–1. The normally horizontal spin axes 15 and 17 and the gyroscopes G–1 and G–2 of the combination are accordingly disposed in mutually perpendicular relation as indicated in FIG. 3. The pick-off PO–2 provides an electrical output in accordance with the displacement of the gyroscope G–2 from its null or reference condition with respect to axis 16. The element equivalent to acceleration sensor A–1 for the gyroscope G–2 portion of the combination is provided by sensor or liquid level A–2. As shown in FIG. 1, the sensor A–2 is fixedly mounted on the platform 1 with its longitudinal axis horizontal and normally aligned with the spin axis 17 of the gyroscope G–2. The liquid levels A–1 and A–2 sense the horizontal component of acceleration along their respective longitudinal axes which depends in the improved combination on the orientation of the platform about axis 10. The outputs of the sensors A–1 and A–2 may be corrected depending on the latitude and the rate of change of longitude of the craft as well as the Earth's rotation rate in the manner described in U.S. Letters Patent No. 2,936,627, issued May 17, 1961 to W. G. Wing et al. for a "Vertical and Velocity Reference Defining System."

As shown in FIG. 2, a lead 18 connects sensor A–1 to the torque motor TM–1 of the stabilizing gyroscope G–1 to control the platform 1 with respect to axis 9 by way of a lead 19 between pick-off PO–1 and the resolver 12 and lead 20 between the resolver 12 and the motor S–11. For the perpendicular horizontal axis 7 of the platform 1, the control includes a lead 21 between the sensor A–2 and torque motor TM–2, a lead 22 between the pick-off PO–2 and the resolver 12, and a lead 23 between the resolver 12 and the motor S–22. In the described combination, the motors S–11 and S–22 are responsive to the output of the resolver 12 to maintain the platform level about its respective axes 7 and 9 as it moves about axis 10. Also, gimbal 3 of the combination is stabilized about axis 5 by a motor S–24 that is responsive to the output of a pick-off 24 mounted on ring 6. The output of the pick-off 24 is dependent on relative angular displacement of the signals 3 and 6 from an out of level condition about the axes 5 and 9. A lead 27 connects the pick-off 24 to the motor S–24.

To provide stabilization for the platform 1 about axis 10, the gyroscope means of the combination includes a third gyroscope G–3 similar in character to the single degree of freedom gyroscopes G–1 and G–2. As shown in FIGS. 1 and 3, the gyroscope G–3 is mounted on the platform or member 1 with its precession axis 25 normal to the vertical axis 10 and its rotor axis 26 normally horizontal. Torque motor TM–3 exerts a torque about the precession axis 25. Also, pick-off PO–3 provides an output depending on the angular displacement of the gyroscope G–3 from a null condition about axis 25 where the axis 26 is horizontal. Motor S–33 carried by the gimbal 8 is responsive to the output of the pick-off PO–3 to control the motion of the platform 1 about axis 10. As shown in FIG. 2, lead 28 connects the pick-off PO–3 to the motor S–33.

The directional reference or null from which the improved combination operates is determined at time zero $t_0$ in FIGS. 5 and 6 where the platform 1 is oriented with respect to North indicated as an arrow N in relation to vertical axis 10. This condition of the parts is clearly shown in FIG. 3 with the spin axis 15 of gyroscope G–1 aligned horizontally North-South and the spin axis 17 of gyroscope G–2 aligned horizontally East-West. According to the present invention, the combination includes means for oscillating the stabilized member or platform 1 about an axis such as axis 10 through a determined cyclic range to average the scale factor errors in the system.

As shown in FIG. 2, the means for oscillating the stabilized member 1 includes timing means 29, a computer 30 responsive to the output of the timing means 29, a D.C. power supply 31 and a relay R–1 whose coil 32 is energized by the output of the computer 30. As shown, lead 33 connects the computer 30 to the coil 32 and shafting 34 connects the timing means 29 to the computer 30. Relay R–1 includes a reversing switch whose ganged knife blades 36 and 37 are respectively connected to the supply 31. Particularly, lead 38 connects the positive terminal of supply 31 to blade 36 and lead 39 connects the negative terminal of supply 31 to blade 37. To reverse the direction of motion of the platform the output of the relay R–1 to the torque motor TM–3 is reversed by moving the blades 36, 37 from the contacts 40, 41 to engage the contacts 42, 43 differentially depending on the programmed output of the computer 30 to coil 32. As shown in FIG. 2, the contacts 42 and 41 of switch 35 are connected to the torque motor TM–3 by way of lead 44. Also lead 45 connects the torque motor TM–3 to the switch contacts 40, 43.

The oscillating means of the improved platform includes the gyroscope G–3, the torque motor TM–3 and the pick-off PO–3 of this gyroscope as well as the motor S–33. In the indicated combination, the motor S–33 provides motive means operatively connected to the platform 1 to move it about axis 10. The pick-off PO–3 provides an output for operating the motor S–33 having a part fixed to the platform and a part movable about the precession axis 25 with the gyroscope G–3 with relation to the fixed part. Motion about axis 10 of the member 1 from its initial orientation as represented in FIG. 3 in a counterclockwise direction as indicated by arrow 46 in FIG. 4 results with the blades 36, 37 of switch 35 shown in the full line position in FIG. 2 to connect supply 31 to the torque motor TM–3. In accordance with the program established by the computer 30 and timing means the oscillating means structure provided produces reversing sequences of angular motion of the member or platform 1 about axis 10 with a cyclic range of at least 720 degrees. In other words, in a complete cycle of operation, the platform 1 is moved through a range of at least one revolution in one direction and through a like range in the opposite direction. The reverse direction portion of the cycle is effected with the contacts 42 and 43 of switch 35 engaged by the blades 36, 37 and with the torque motor TM–3 energized by supply 31 in the opposite polarity sense. Between the reversals the motion of the platform 1 about the axis 10 occurs at a uniform rate at about 1 cycle per hour without loss of the stability provided for the platform by the gyroscope G–3.

As shown in FIGS. 5 and 6, the portion of the curves 47 and 48 between time zero $t_0$ and the first time interval $t_1$ is indicated to have a duration of a quarter of a cycle or angular range from a starting condition of 180 degrees. With the first reversal occurring at time $t_1$, the errors in the system are averaged to null as shown in FIG. 6 as the platform moves in sequence over an initial quarter cycle in a counterclockwise direction, moves in the first half cycle in a clockwise direction and moves in the second half cycle in a counterclockwise direction. As shown in FIG. 5, the first complete cycle is started at time $t_1$ and completed at $t_3$. The direction of travel of the platform 1 is reversed at time $t_2$ from a clockwise to a counterclockwise motion. As shown in FIGS. 5 and 6 the computer initiates the reversing motion sequences to move the platform through a starting angular range of a quarter of a cycle or 180 degrees. Rates of rotation of the platform 1 that are avoided in practice correspond to the total craft space rate.

The second rate avoided corresponds to the Schuler frequency of 253 degrees per hour.

The minimum sweep range herein stated is required in the improved combination for the purpose of error averaging. This is demonstrated in FIG. 4 where angle $\alpha$ is the angle between the spin axis of the gyroscope G-1 and the reference N direction at any point in the operation of the system. The vector $\omega_N$ represents drift of the platform about its reference direction N and the vector $\omega_E$ represents drift of the platform about a horizontal line perpendicular to N. Here, with the gyroscopes moved from the positions shown in FIG. 3 to that shown in FIG. 4, platform drift referred to the Earth may be expressed mathematically as follows:

$$\omega_N = (\text{Drift of G-2}) \cos \alpha + (\text{Drift of G-1}) \sin \alpha$$

$$\omega_E = -(\text{Drift of G-2}) \sin \alpha + (\text{Drift of G-1}) \cos \alpha$$

Here, for the factors $\omega_N$ and $\omega_E$ to have a zero average value, the angle $\alpha$ must sweep through integer multiples of 360 degrees. As stated mathematically:

$$\bar{\omega}_N = \frac{1}{\alpha} \int_0^\alpha (D_{G-2} \cos \alpha + D_{G-1} \sin \alpha) d\alpha$$

integrating, $$\bar{\omega}_N = \frac{1}{\alpha} [D_{G-2} \sin \alpha - D_{G-1} \cos \alpha]_0^\alpha$$

$$\bar{\omega}_N = \frac{1}{\alpha} [(D_{G-2} \sin \alpha - D_{G-1} \cos \alpha) - (D_{G-2} \sin 0 - D_{G-1} \cos 0)]$$

simplifying $$\bar{\omega}_N = \frac{1}{\alpha} [D_{G-2} \sin \alpha - D_{G-1} \cos \alpha) + D_{G-1}]$$

Similarly $$\bar{\omega}_E = \frac{1}{\alpha} \int_0^\alpha (-D_{G-2} \sin \alpha + D_{G-1} \cos \alpha) d\alpha$$

integrating $$\bar{\omega}_E = \frac{1}{\alpha} [D_{G-2} \cos \alpha + D_{G-1} \sin \alpha - D_{G-2}]$$

From the above, it is apparent that for integer multiples of 360 degrees for angle $\alpha$ that both $\bar{\omega}_N$ and $\bar{\omega}_E$ are equal to zero. It is not possible to obtain this result where there is continuous unidirectional rotation of the platform.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A combination for averaging the errors in a gyroscopic stabilization system including a member mounted with freedom about an axis, gyroscopic means for stabilizing the member about its axis having a precession axis normally perpendicular to the axis of the member; and means for oscillating the stabilized member about its axis including motive means operatively connected to the member, a pick-off providing an output for operating the motive means having a part fixed to the member and a exerting a torque about a precession axis of the gyroscope means with respect to the fixed part, means for exerting a torque about the precession axis of the gyroscope, timing means, and a computer connected to the timing means for programming the operation of the torquing means to produce reversing sequences of angular motion of the member about its axis with a cyclic range of at least 720 degrees.

2. A combination of the character claimed in claim 1, in which the computer includes means for initiating the reversing motion sequence operable to move the member through a starting angular range of a quarter of a cycle.

3. A combination of the character claimed in claim 1, in which the axis of the member is normally vertical, the gyroscopic means is a gyroscope with a rotor spinning about a normally horizontal axis, and the precession axis of the gyroscope is normally horizontal and perpendicular to the spin axis of the rotor.

4. A combination of the character claimed in claim 1, in which the member is a platform mounted with freedom about a normally vertical axis and orthogonal normally horizontal axes, and the gyroscopic means for stabilizing the platform are three gyroscopes of the single degree of freedom type, one of which provides stabilization for the platform about its vertical axis, another of which provides stabilization for the platform about one of its horizontal axes, and the third of which provides stabilization for the platform about the other of its horizontal axes.

5. A combination for averaging the errors in a gyroscopic stabilization system including a platform mounted with freedom about a normally vertical axis, a gyroscope for stabilizing the platform about its vertical axis having normally horizontal perpendicular precession and rotor spin axes; and means for oscillating the stabilized platform about its vertical axis including a motor operatively connected to the platform, means providing an output for energizing the motor depending on tilt of the gyroscope about its precession axis, a torque motor at the precession axis of the gyroscope, timing means, and a computer connected to the timing means for exciting and reversing the torque motor to produce sequences of angular motion of the platform about its vertical axis with a total cyclic range of 720 degrees.

6. A combination of the character claimed in claim 5, in which the computer includes means for initiating the reversing motion sequence operable to move the platform through a starting angular range of 180 degrees.

7. A combination of the character claimed in claim 5, in which the platform is also mounted with freedom about orthogonal normally horizontal axes, and the system includes a second gyroscope for stabilizing the platform about one of its horizontal axes, and a third gyroscope for stabilizing the platform about the other of its horizontal axes.

8. A combination of the character claimed in claim 7, in which the second and third gyroscopes include torque motors, and including a first acceleration sensor mounted on the platform operatively connected to the torque motor of the second gyroscope, and a second acceleration sensor mounted on the platform operatively connected to the torque motor of the third gyroscope.

9. In a stabilizing gyroscopic combination, a member mounted with freedom about an axis, a gyroscope having a precession axis normally perpendicular to the axis of the member, a pick-off with an output depending upon the angular displacement of the gyroscope from a null condition about its precession axis, motive means connected to move the member about its axis responsive to the output of the pick-off, means for exerting a torque about the precession axis of the gyroscope, timing means, and programming means responsive to the timing means for exciting and reversing the torque exerting means to move the member cyclically about its axis through angular range of at least one revolution in one direction and through a like range in the opposite direction.

10. In a stabilizing gyroscopic combination, a platform mounted with freedom about a normally vertical axis and two orthogonal normally horizontal axes, a gyroscope for stabilizing the platform about its vertical axis having a precession axis normally perpendicular to the axis of the platform, a pick-off having a part fixed to the platform and a part movable with the gyroscope, motive means connected to the pick-off for moving the platform about its vertical axis, means for exerting a torque about the precession axis of the gyroscope, a second gyroscope for stabilizing the platform about one of its horizontal axes, a third gyroscope for stabilizing the platform about the other of its axes, timing means, and programming means responsive to the timing means for operating the torque exerting means to move the platform cyclically about its vertical axis through a range of at least one revolution in one direction and through a like range in the opposite direction.

11. In a stabilizing gyroscopic combination, a member mounted with freedom about three normally mutually perpendicular axes; three single degree of freedom gyroscopes for stabilizing the member about its axes having respective precession axes normally perpendicular to the axes of the member, means for exerting a torque about a first precession axis, means for exerting a torque about a second axis, means for exerting a torque about a third axis, timing means, and a computer responsive to the timing means for operating the first of the torque exerting means to move the member cyclically about one of its axes through a range of at least one revolution in one direction and through a like range in the opposite direction.

12. A combination of the character claimed in claim 11, including a first acceleration sensor operatively connected to the second torque exerting means, and a second acceleration sensor operatively connected to the third torque exerting means.

References Cited

UNITED STATES PATENTS

| | | | |
|---|---|---|---|
| 2,981,113 | 4/1961 | Erdley | 74—5 X |
| 3,052,129 | 9/1962 | Rocks | 74—5.34 |
| 3,214,981 | 11/1965 | Cogan | 74—5.4 |

FRED C. MATTERN, Jr., *Primary Examiner.*

J. D. PUFFER, C. J. HUSAR, *Assistant Examiners.*